United States Patent
Miao et al.

(10) Patent No.: US 11,609,443 B2
(45) Date of Patent: Mar. 21, 2023

(54) CHALCOGENIDE PHASE CHANGE MATERIAL BASED ALL-OPTICAL SWITCH AND MANUFACTURING METHOD THEREFOR

(71) Applicant: HUAZHONG UNIVERSITY OF SCIENCE AND TECHNOLOGY, Hubei (CN)

(72) Inventors: Xiangshui Miao, Hubei (CN); Yitao Lu, Hubei (CN); Hao Tong, Hubei (CN); Yi Wang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 385 days.

(21) Appl. No.: 16/764,403

(22) PCT Filed: Jun. 7, 2018

(86) PCT No.: PCT/CN2018/090242
§ 371 (c)(1),
(2) Date: May 15, 2020

(87) PCT Pub. No.: WO2019/095677
PCT Pub. Date: May 23, 2019

(65) Prior Publication Data
US 2020/0379276 A1 Dec. 3, 2020

(30) Foreign Application Priority Data
Nov. 15, 2017 (CN) .......................... 201711152828.9

(51) Int. Cl.
*G02F 1/01* (2006.01)
*G02B 1/00* (2006.01)
*G02F 1/00* (2006.01)

(52) U.S. Cl.
CPC .......... *G02F 1/0126* (2013.01); *G02B 1/005* (2013.01); *G02F 1/0063* (2013.01); *G02F 2202/32* (2013.01); *G02F 2202/36* (2013.01)

(58) Field of Classification Search
CPC .............. G02B 1/005; G02B 2207/101; G02B 2006/12061; G02B 2006/12107;
(Continued)

(56) References Cited

U.S. PATENT DOCUMENTS

2012/0170359 A1* 7/2012 Wu .................... G11C 13/0069
365/163

FOREIGN PATENT DOCUMENTS

CN 101718939 * 11/2009 ............... G02F 1/35

OTHER PUBLICATIONS

B. Gholipour, J. Zhang, K. F. MacDonald, D. W. Hewakand N. I. Zheludev, Chalcogenide metamaterial phase change all-optical switch of nanoscale thickness, Optoelectronics Research Centre, University of Southampton, Southampton, SO17 1BJ, 2012.*

* cited by examiner

*Primary Examiner* — Brandi N Thomas
(74) *Attorney, Agent, or Firm* — JCIP Global Inc.

(57) ABSTRACT

Disclosed in the present invention are a chalcogenide phase change material based all-optical switch and a manufacturing method therefor, relating to the field of optical communications. The all-optical switch comprises: stacked in sequence, a cover layer film, a chalcogenide phase change material film, an isolation layer film, a silicon photonic crystal, and a substrate. The silicon photonic crystal comprises a nano-porous structure such that the silicon photonic crystal has a Fano resonance effect. When the all-optical switch is used, the state of the chalcogenide phase change material film is controlled by means of laser, and the
(Continued)

resonance state of the silicon photonic crystal is modulated to implement modulation of signal light transmissivity; the modulation range is within a communication band from 1500 nm to 1600 nm, thereby implementing an optical switch. The all-optical switch of the present invention has the characteristics of high contrast ratio, high rate and low loss.

8 Claims, 5 Drawing Sheets

(58) Field of Classification Search
CPC .... G02B 6/107; G02B 6/12014; G02B 6/136; G02B 6/00; G02B 6/02347; G02B 6/1225; A61B 18/203; A61B 2018/00577; A61B 2018/00613; A61B 2018/00642; A61B 2018/00785; A61B 2018/00904; A61B 2018/20355; A61B 2018/20359; A61B 18/20; A61F 2009/00846; A61F 2009/00851; A61F 2009/00865; A61F 2009/00878; A61F 2009/0088; A61F 2009/00882; A61F 2009/00895; A61F 2009/00897; A61F 9/0017; A61F 9/008; A61F 9/00802; A61F 9/00825; A61F 9/00838; G02F 1/0063; G02F 1/0126; G02F 2202/32; G02F 2202/36; G02F 1/0128

See application file for complete search history.

US 11,609,443 B2

CHALCOGENIDE PHASE CHANGE MATERIAL BASED ALL-OPTICAL SWITCH AND MANUFACTURING METHOD THEREFOR

CROSS-REFERENCE TO RELATED APPLICATION

This application is a 371 of international application of PCT application serial no. PCT/CN2018/090242, filed on Jun. 7, 2018, which claims the priority benefit of China application no. 201711152828.9, filed on Nov. 15, 2017. The entirety of each of the above mentioned patent applications is hereby incorporated by reference herein and made a part of this specification.

BACKGROUND

Technical Field

The disclosure belongs to the field of optical communication, and more specifically, relates to a chalcogenide phase change material based all-optical switch and a manufacturing method therefor.

Description of Related Art

Nowadays social communication is carried out mainly through optical fiber communication. However, due to the rapid development of the Internet and the emergence of new technologies such as the Internet of Things, people have higher requirements for the transmission rate of optical fiber communication. In the existing conventional optical fiber communication system, there are a large number of optical interconnection switching devices at nodes, and there is a large amount of photoelectric optical conversions between these devices. Due to the bottlenecks caused by electrons, this photoelectric conversion process reduces the rate of optical fiber communication in practice. Therefore, many scholars and experts have proposed the concept of all-optical communication, that is, using light to control light, such that there is no photoelectric conversion node in the whole process, and there is no photoelectric conversion process either. In this mode, the potential of the fiber itself can be developed more thoroughly.

As a basic device for the realization of all-optical communication, all-optical switches have received a lot of attention. The exiting technology uses the photoinduced phase change characteristics of vanadium dioxide materials and the polarization selection effect of metal gratings on light to exchange light, but metal gratings cause a large loss of optical energy, and the switch contrast is relatively low. Another existing technology uses the thermo-optical effect of graphene to cause the resonance change of the micro-resonant ring fiber to realize the optical switching, although such approach can realize all-optical switch and the loss is small, the switching rate is slow, and the structure is complicated to be actually implemented for large-scale array integration. There is also another existing technology using the Mach-Zehnder interferometer to introduce an optical path to interfere, thereby achieving all-optical switching. However, the structure of the Mach-Zehnder interferometer is relatively complicated and thus it is difficult to carry out large-scale integration, and its practicality is limited.

In view of the above, the existing technology has the technical problems of slow switching rate, large loss, and difficulty in large-scale integration.

SUMMARY

Technical Problem

In view of the above defects or needs for improvement of the related art, the disclosure provides a chalcogenide phase change material based all-optical switch and a manufacturing method therefor, thereby solving the technical problems of the related art, namely, the switching rate is slow, the loss is large, and it is difficult to carry out a large-scale integration.

In order to achieve the above purpose, according to one aspect of the disclosure, a chalcogenide phase change material based all-optical switch is provided, which includes a cover layer film, a chalcogenide phase change material film, an isolation layer film, a silicon photonic crystal and a substrate stacked in sequence.

Further, the silicon photonic crystal includes a nano-porous structure, so that the silicon photonic crystal has a Fano resonance effect.

Further, the radius of the nanopores in the nano-porous structure is 50 nm to 90 nm, the spacing between the nanopores is 700 nm to 850 nm, and the depth of the nanopores is 150 nm to 250 nm.

Further, the thickness of the chalcogenide phase change material film is 5 nm to 25 nm, and the chalcogenide phase change material film is a multi-component chalcogenide phase change material or a doped compound formed by doping impurities with the multi-component chalcogenide phase change material.

Further, the multi-component chalcogenide phase change material is GeTe, SbTe, $Bi_2Te_3$, GeSe, $Bi_2Se_3$, $Ge_2Sb_2Te_5$ or AgInSbTe, and the impurities are C, N, O, Ag or Cu.

Further, the thickness of the isolation layer film is 15 nm to 40 nm, and the isolation layer film is a $SiO_2$ film or a $SiN_x$ film.

Further, the thickness of the cover layer film is 20 nm to 200 nm, and the cover layer film is a $SiO_2/ZnS$ film, a $SiO_2$ film or a $SiN_x$ film.

Further, when the all-optical switch is in use, the state of the chalcogenide phase change material film is controlled by laser, and the resonance state of the silicon photonic crystal is modulated to realize the modulation of the signal light transmittance. The modulation range is 1500 nm to 1600 nm in the communication band, thereby realizing optical switching.

According to another aspect of the disclosure, a method for manufacturing a chalcogenide phase change material based all-optical switch is provided, including:

(1) Depositing a single crystal silicon material on the substrate, and etching nanopores on the single crystal silicon material to form silicon photonic crystals. The radius of the nanopores is 50 nm to 90 nm, the spacing between the nanopores is 700 nm to 850 nm, and the depth of the nanopores is 150 nm to 250 nm;

(2) Depositing an isolation layer film with a thickness of 15 nm to 40 nm on the silicon photonic crystal;

(3) Depositing a chalcogenide phase change material film with a thickness of 5 nm to 25 nm on the isolation layer film;

(4) Depositing a cover layer film with a thickness of 20 nm to 200 nm and having oxidation resistance on the chalcogenide phase change material film to obtain an all-optical switch.

Further, the etching process is electron beam lithography or ion-coupled plasma etching, and the deposition process is chemical vapor deposition, physical vapor deposition, electron beam evaporation coating, pulse laser deposition, atomic layer deposition, DC magnetron sputtering or radio frequency magnetron sputtering. A manufacturing method of a chalcogenide phase change material based all-optical switch is characterized in that it includes:

Preferably, a manufacturing method of a chalcogenide phase change material based all-optical switch includes:

(1) Using a single crystal silicon material as a substrate, nano-pores are etched on the single crystal silicon material to form a silicon photonic crystal. The radius of the nanopores is 50 nm to 90 nm, the spacing between the nanopores is 700 nm to 850 nm, and the depth of the nanopores is 150 nm to 250 nm;

(2) Depositing an isolation layer film with a thickness of 15 nm to 40 nm on the silicon photonic crystal;

(3) Depositing a chalcogenide phase change material film with a thickness of 5 nm to 25 nm on the isolation layer film;

(4) Depositing a cover layer film with a thickness of 20 nm to 200 nm and having oxidation resistance on the chalcogenide phase change material film to obtain an all-optical switch.

Generally speaking, compared with the related art, the above technical solutions conceived by the disclosure can achieve the following advantageous effects:

(1) When the all-optical switch of the disclosure is in use, the state of the chalcogenide phase change material film is controlled by laser, and the resonance state of the silicon photonic crystal is modulated to realize the modulation of the signal light transmittance. The modulation range is 1500 nm to 1600 nm in the communication band, thereby realizing optical switching. The chalcogenide phase change material is stable in physical and chemical properties at normal temperature, so the switch is non-volatile. The all-optical switch of the disclosure has the characteristics of high contrast, high rate, and low loss. The all-optical switch has a simple structure and therefore production costs can be reduced. The all-optical switch is adaptable for CMOS integration and can easily match modern semiconductor process production lines, thus being suitable for industrial production and productization.

(2) Existing technologies are mostly based on photonic crystal thermal effect or in combination with metal materials. In comparison, the switching ratio is relatively low, and since metals have higher absorption of near-infrared light, a large amount of loss is likely to occur. Many of the existing technologies are complicated in manufacturing process, which is not advantageous for large-scale integration and productization. The overall structure of the disclosure is a vertical film stack structure, which is convenient for CMOS integration process preparation. The switching spectrum communication band of the disclosure is in the common range of 1500 nm to 1600 nm, which can meet the requirement of the communication band. The disclosure has a larger switching ratio.

DESCRIPTION OF THE EMBODIMENTS

In order to make the purpose, technical solutions and advantages of the disclosure clearer, the disclosure will be further described in detail with reference to the accompanying drawings and embodiments. It should be understood that the specific embodiments described herein are only used to explain the disclosure, and are not intended to limit the disclosure. In addition, the technical features involved in the various embodiments of the disclosure described below can be combined with each other as long as there is no conflict with each other.

By utilizing the specific resonance absorption effect of silicon photonic crystals with respect to light, and with the use of laser with a certain power level, the disclosure can make the chalcogenide phase change material of the intermediate layer material to undergo a phase change. The chalcogenide phase change material has a crystalline state and an amorphous state. There is a large difference in refractive index between the two different states. For optical switching devices, the switching rate and contrast are important indicators to measure the performance of the device, while the chalcogenide phase change materials have a phase-change rate at a femtosecond level, silicon photonic crystals have a higher extinction ratio with respect to resonance absorption of light.

Figure 1:
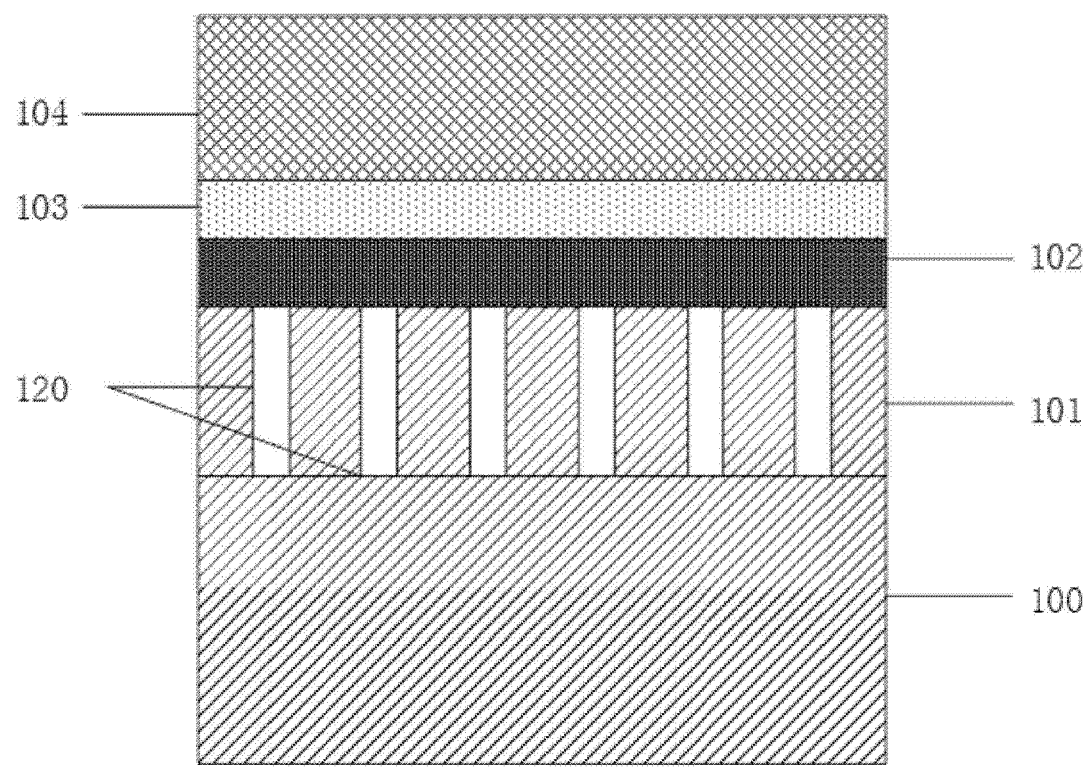
FIG. 1 is a schematic view of a chalcogenide phase change material based all-optical switch described in an embodiment of the disclosure.

As shown in FIG. 1, a chalcogenide phase change material based all-optical switch includes a cover layer film 104, a chalcogenide phase change material film 103, an isolation layer film 102, a silicon photonic crystal 101 and a substrate 100 that are stacked in sequence. The silicon photonic crystal 101 includes a nano-porous structure 120 so that the silicon photonic crystal 101 has a Fano resonance effect. The chalcogenide phase change material film 103 has a phase-change characteristic, and can undergo a reversible phase change under the effect of pulse laser with different intensity, repetitive frequency. The radius of the nanopores in the nano-porous structure 120 is 50 nm to 90 nm, the spacing between the nanopores is 700 nm to 850 nm, and the depth of the nanopores is 150 nm to 250 nm. The thickness of the chalcogenide phase change material film 103 is 5 nm to 25 nm, and the chalcogenide phase change material film 103 is a multi-component chalcogenide phase change material or a doped compound formed by doping impurities with the multi-component chalcogenide phase change material. The multi-component chalcogenide phase change material is GeTe, SbTe, $Bi_2Te_3$, GeSe, $Bi_2Se_3$, $Ge_2Sb_2Te_5$, or AgIn-SbTe, and the impurities are C, N, O, Ag, or Cu. The thickness of the isolation layer film 102 is 15 nm to 40 nm, and the isolation layer film 102 is a $SiO_2$ film or a $SiN_x$ film. The thickness of the cover layer film 104 is 20 nm to 200 nm, and the cover layer film 104 is a $SiO_2$/ZnS film, a $SiO_2$ film, or a $SiN_x$ film.

Figure 2:
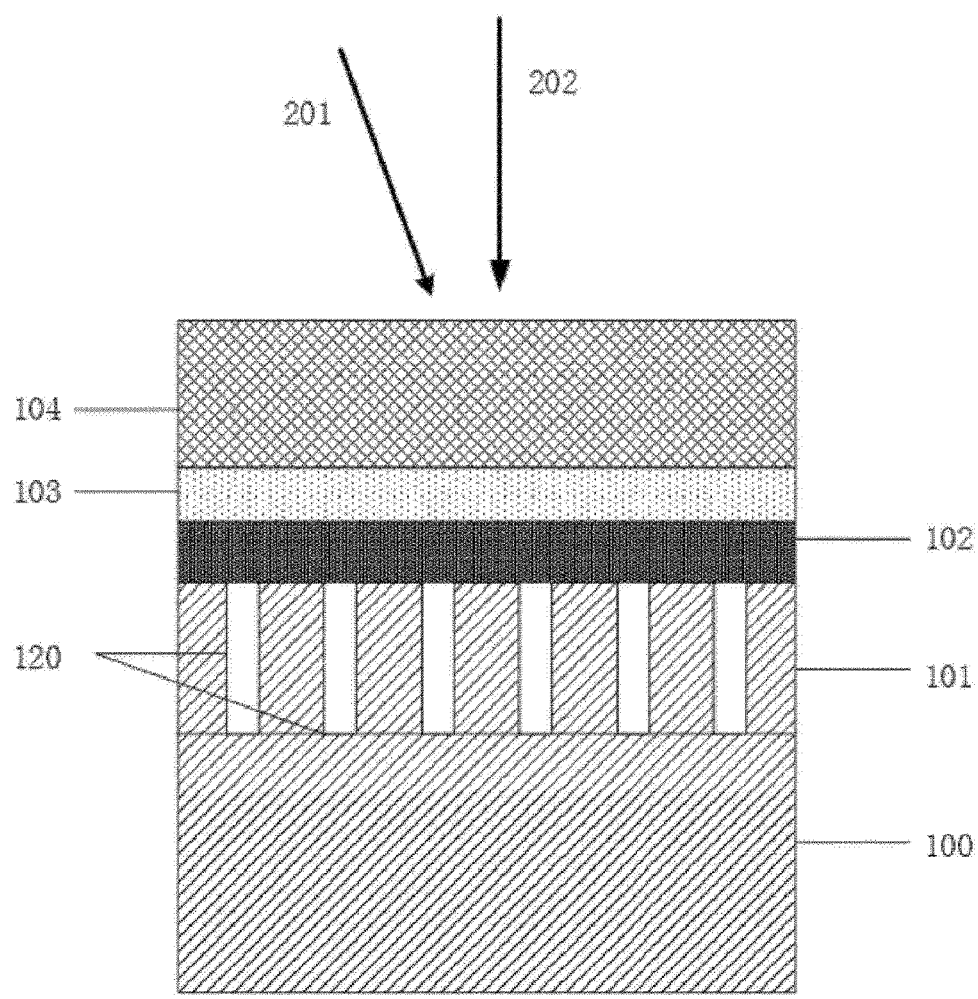
FIG. 2 is a schematic view of the use of a chalcogenide phase change material based all-optical switch described in an embodiment of the disclosure.

As shown in FIG. 2, when the all-optical switch is in use, the state of the chalcogenide phase change material film 103 is controlled by laser 201, and the resonance state of the silicon photonic crystal 101 is modulated to realize modulation of the transmittance of the signal light 202. The modulation range is 1500 nm to 1600 nm in the communication band, thereby realizing optical switching.

The phase change mechanism of the chalcogenide phase change material can be the phase change of the chalcogenide phase change material caused by the photothermal effect, or the lattice damage of the chalcogenide phase change material caused by the effect of laser pulse, or collision ionization inside the chalcogenide phase change material caused by pulse.

The all-optical switch is non-volatile, that is, in absence of the laser 201, the switch state does not change at a certain temperature. The chalcogenide phase change material film 103 has ultrafast phase-change characteristics.

Figure 3:
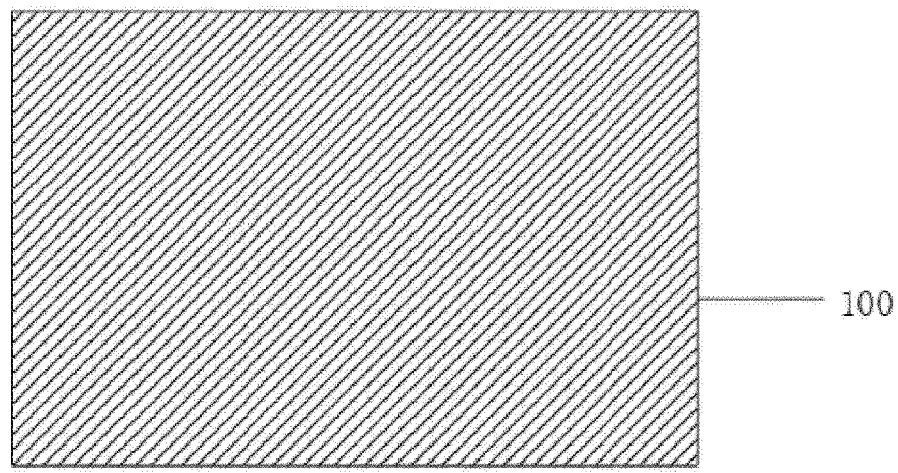
FIG. 3 illustrates a substrate with an unetched chalcogenide phase change material based all-optical switch described in an embodiment of the disclosure.
Figure 4:
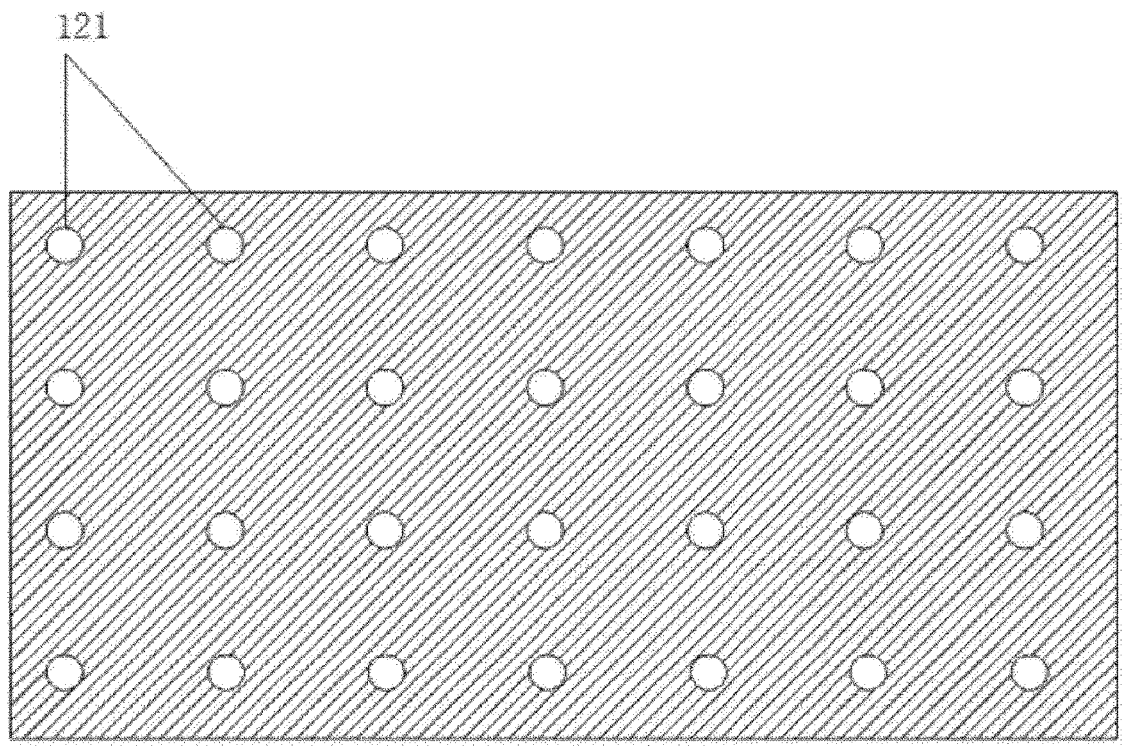
FIG. 4 is a top view of an etched chalcogenide phase change material based all-optical switch described in an embodiment of the disclosure.
Figure 5:
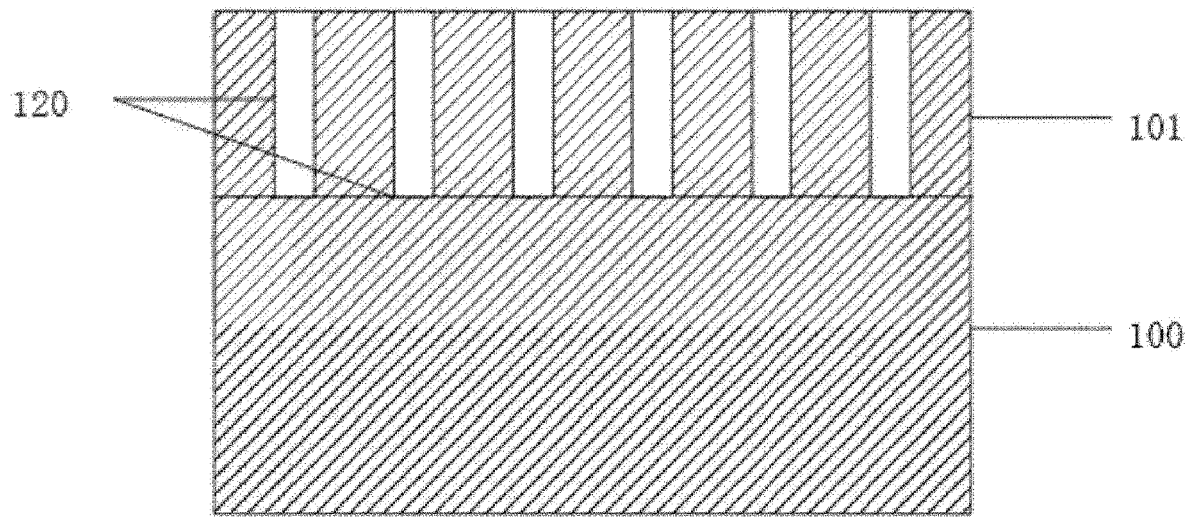
FIG. 5 is a cross-sectional view of an etched chalcogenide phase change material based all-optical switch described in an embodiment of the disclosure.
Figure 6:
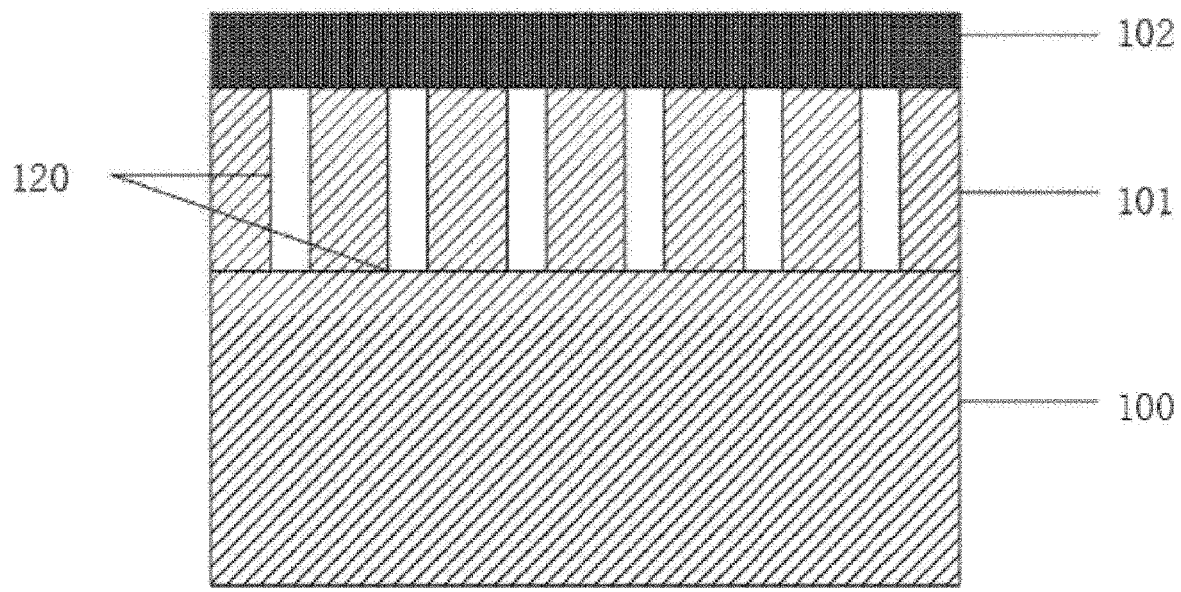
FIG. 6 is a cross-sectional view of a chalcogenide phase change material based all-optical switch after deposition of an isolation layer film described in an embodiment of the disclosure.
Figure 7:
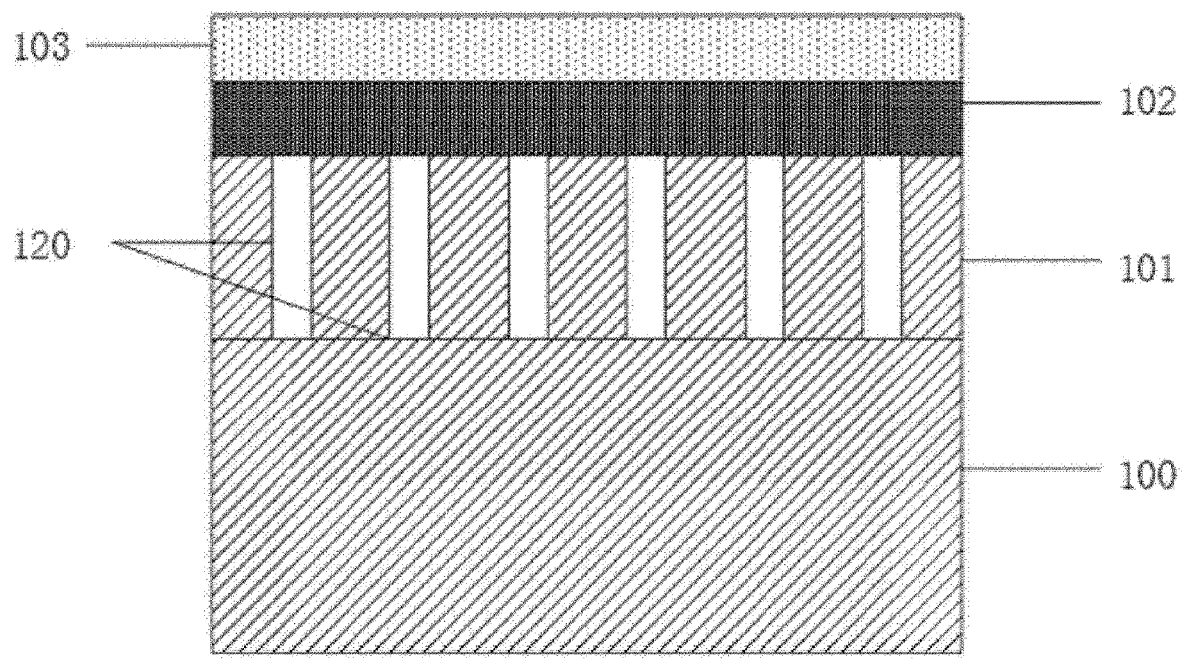
FIG. 7 is a cross-sectional view of a chalcogenide phase change material based all-optical switch after deposition of a chalcogenide phase change material film described in an embodiment of the disclosure.

FIG. 3 illustrates a substrate with an unetched chalcogenide phase change material based all-optical switch described in an embodiment of the disclosure. A single crystal silicon material is deposited on the substrate 100, and nanopores are etched on the single crystal silicon material to form a silicon photonic crystal 101, and the nanopores 121 are etched on the silicon photonic crystal 101. The radius of the nanopores 121 is 50 nm to 90 nm, the spacing between the nanopores is 700 nm to 850 nm, and the depth of the nanopores is 150 nm to 250 nm. The top view of the etched silicon photonic crystal as shown in FIG. 4 and the cross-sectional view of the etched silicon photonic crystal as shown in FIG. 5 are obtained. An isolation layer film 102 with a thickness of 15 nm to 40 nm is deposited on the silicon photonic crystal 101 as shown in FIG. 6. A chalcogenide phase change material film 103 having a thickness of 5 nm to 25 nm is deposited on the isolation layer film 102 as shown in FIG. 7. A cover layer film with a thickness of 20 nm to 200 nm and having oxidation resistance is deposited on the chalcogenide phase change material film to obtain an all-optical switch. The etching process is electron beam lithography or ion-coupled plasma etching, and the deposition process is chemical vapor deposition, physical vapor deposition, electron beam evaporation coating, pulse laser deposition, atomic layer deposition, DC magnetron sputtering or radio frequency magnetron sputtering.

Ion-coupled plasma etching technology is that the gas exposed to the electron area forms a plasma, and the resulting ionized gas and gas that emits high-energy electrons form a plasma or an ion. When the ionized gas atoms are accelerated by the electric field, they will release sufficient force to tightly adhere materials together or etch the surface along with the surface expelling force. Chemical vapor deposition is the ionization of gases containing film constituent atoms by means of microwave or radio frequency, etc., and plasma is formed locally. Since the plasma is very chemically active and easily generates reaction, the desired film can be deposited on the substrate. DC magnetron sputtering is a process for physical vapor deposition of films. By adding a closed magnetic field parallel to the target surface in dipole sputtering, the secondary electrons are bound to the specific area of the target surface to enhance ionization efficiency and increase ion density and ion energy by means of the orthogonal electromagnetic field formed on the target surface, thereby achieving a high-rate sputtering process. In terms of DC magnetron sputtering, the process is typically used for conductor materials. The radio frequency magnetron sputtering uses a radio frequency source, and is mainly applied in the sputtering of insulating materials.

Figure 8:
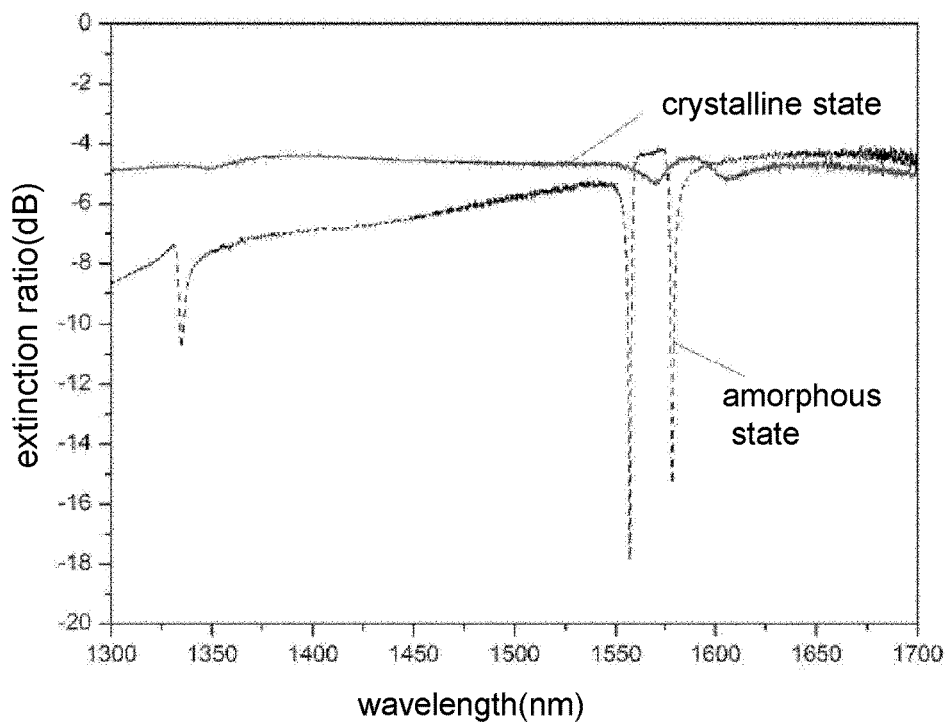
FIG. 8 is a transmission extinction spectrum of a chalcogenide phase change material based all-optical switch described in an embodiment of the disclosure.
Figure 9:
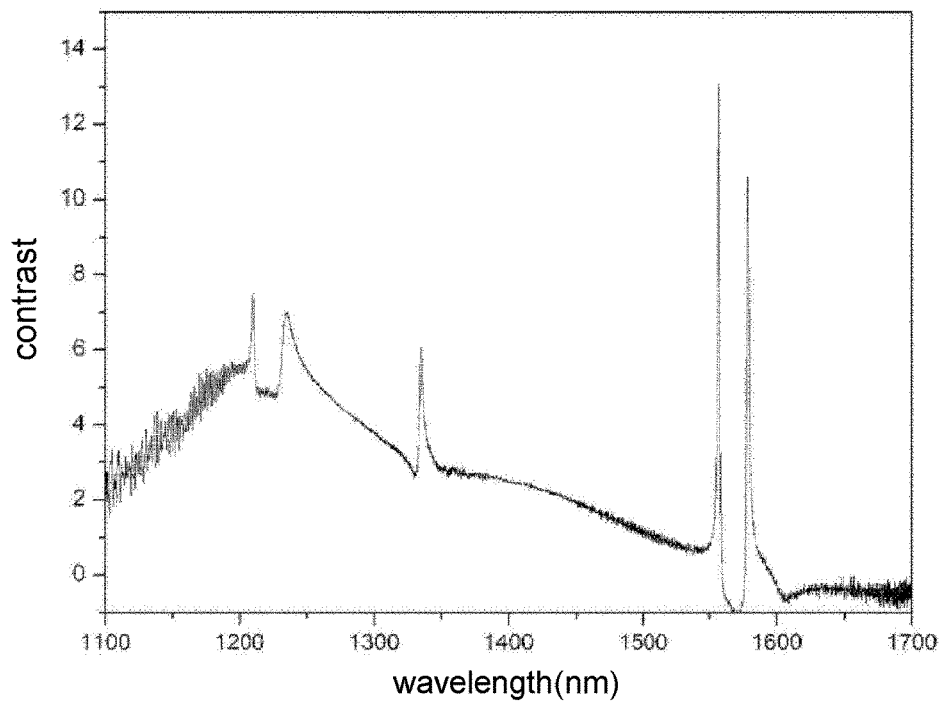
FIG. 9 is an extinction contrast of a chalcogenide phase change material based all-optical switch described in an embodiment of the disclosure.

FIG. 8 shows the measured transmission extinction spectrum before and after the phase change of the all-optical switch with a spectral test range of 1000 nm to 1700 nm, FIG. 9 is an extinction contrast of a chalcogenide phase change material based all-optical switch described in an embodiment of the disclosure. It can be seen from FIG. 9 that in the wavelength range of 1500 nm to 1600 nm, the switching ratio of the embodiment of the disclosure in the amorphous and crystalline states is close to 13. Chalcogenide phase change materials usually have an amorphous state (the molecules, atoms, or ions that make up a substance are solids not arranged in spatial regularity and distribution period and is isotropic) and a crystalline state (the molecules, atoms, or ions that make up a substance have regular spatial arrangement and are anisotropic) that are relatively stable, and the crystallization temperature and melting temperature therefor are about 190° C. and 690° C., respectively. Through rapid heating and rapid cooling, it can quickly turn into the amorphous state after melting. There is a large difference in refractive index between the two states. The photonic crystal having a silicon porous structure has a specific resonance absorption effect with respect to light. The size of the silicon pores determines the wavelength range of specifically absorbed light, and the absorption resonance capacity is related to the refractive index of the surface environment. By depositing the chalcogenide phase change material on the photonic crystal having the silicon porous structure, and by using the effect of laser to change the state of the chalcogenide phase change material, the absorption of light of a specific wavelength can be changed, so that causing the shift in the transmission spectrum, thereby achieving the switching effect of light.

Example 1

A manufacturing method of a chalcogenide phase change material based all-optical switch includes:

(1) Depositing a single crystal silicon material on the substrate, and etching nanopores on the single crystal silicon material to form silicon photonic crystals. The radius of the nanopores is 50 nm, the spacing between the nanopores is 700 nm, and the depth of the nanopores is 150 nm;

(2) Depositing a $SiO_2$ film having a thickness of 15 nm on the silicon photonic crystal;

(3) Depositing a GeTe layer having a thickness of 5 nm on the isolation layer film;

(4) Depositing a $SiN_x$ film having a thickness of 20 nm and oxidation resistance on the chalcogenide phase change material film to obtain an all-optical switch. The etching process is electron beam lithography, and deposition process is chemical vapor deposition.

Example 2

A manufacturing method of a chalcogenide phase change material based all-optical switch includes:

(1) Depositing a single crystal silicon material on the substrate, and etching nanopores on the single crystal silicon material to form silicon photonic crystals. The radius of the nanopores is 90 nm, the spacing between the nanopores is 850 nm, and the depth of the nanopores is 250 nm;

(2) Depositing a $SiO_2$ film having a thickness of 40 nm on the silicon photonic crystal;

(3) Depositing a SbTe layer having a thickness of 25 nm on the isolation layer film;

(4) Depositing a $SiO_2$ film having a thickness of 200 nm and oxidation resistance on the chalcogenide phase change material film to obtain an all-optical switch. The etching process is electron beam lithography, and deposition process is radio frequency magnetron sputtering.

Example 3

A manufacturing method of a chalcogenide phase change material based all-optical switch includes:

(1) Depositing a single crystal silicon material on the substrate, and etching nanopores on the single crystal silicon material to form silicon photonic crystals. The radius of the nanopores is 70 nm, the spacing between the nanopores is 800 nm, and the depth of the nanopores is 200 nm;

(2) Depositing a $SiN_x$ film having a thickness of 30 nm on the silicon photonic crystal;

(3) Depositing a $Bi_2Te_3$ layer having a thickness of 15 nm on the isolation layer film;

(4) Depositing a $SiO_2/ZnS$ film having a thickness of 100 nm and oxidation resistance on the chalcogenide phase change material film to obtain an all-optical switch. The etching process is ion-coupled plasma etching, and the deposition process is DC magnetron sputtering.

Example 4

A manufacturing method of a chalcogenide phase change material based all-optical switch includes:

(1) Depositing a single crystal silicon material on the substrate, and etching nanopores on the single crystal silicon material to form silicon photonic crystals. The radius of the nanopores is 70 nm, the spacing between the nanopores is 800 nm, and the depth of the nanopores is 200 nm;

(2) Depositing a $SiN_x$ film having a thickness of 30 nm on the silicon photonic crystal;

(3) Depositing a GeSe layer having a thickness of 15 nm on the isolation layer film;

(4) Depositing a $SiO_2/ZnS$ film having a thickness of 100 nm and oxidation resistance on the chalcogenide phase change material film to obtain an all-optical switch. The etching process is ion-coupled plasma etching, and the deposition process is physical vapor deposition.

Example 5

A manufacturing method of a chalcogenide phase change material based all-optical switch includes:

(1) Depositing a single crystal silicon material on the substrate, and etching nanopores on the single crystal silicon material to form silicon photonic crystals. The radius of the nanopores is 70 nm, the spacing between the nanopores is 800 nm, and the depth of the nanopores is 200 nm;

(2) Depositing a $SiN_x$ film having a thickness of 30 nm on the silicon photonic crystal;

(3) Depositing a $Bi_2Se_3$ layer having a thickness of 15 nm on the isolation layer film;

(4) Depositing a $SiO_2/ZnS$ film having a thickness of 100 nm and oxidation resistance on the chalcogenide phase change material film to obtain an all-optical switch. The etching process is ion-coupled plasma etching, and the deposition process is electron beam evaporation coating.

Example 6

A manufacturing method of a chalcogenide phase change material based all-optical switch includes:

(1) Depositing a single crystal silicon material on the substrate, and etching nanopores on the single crystal silicon material to form silicon photonic crystals. The radius of the nanopores is 70 nm, the spacing between the nanopores is 800 nm, and the depth of the nanopores is 200 nm;

(2) Depositing a $SiN_x$ film having a thickness of 30 nm on the silicon photonic crystal;

(3) Depositing a $Ge_2Sb_2Te_5$ layer having a thickness of 15 nm on the isolation layer film;

(4) Depositing a $SiO_2/ZnS$ film having a thickness of 100 nm and oxidation resistance on the chalcogenide phase change material film to obtain an all-optical switch. The etching process is ion-coupled plasma etching, and the deposition process is pulsed laser deposition.

Example 7

A manufacturing method of a chalcogenide phase change material based all-optical switch includes:

(1) Depositing a single crystal silicon material on the substrate, and etching nanopores on the single crystal silicon material to form silicon photonic crystals. The radius of the nanopores is 70 nm, the spacing between the nanopores is 800 nm, and the depth of the nanopores is 200 nm;

(2) Depositing a $SiN_x$ film having a thickness of 30 nm on the silicon photonic crystal;

(3) Depositing a AgInSbTe layer having a thickness of 15 nm on the isolation layer film;

(4) Depositing a $SiO_2/ZnS$ film having a thickness of 100 nm and oxidation resistance on the chalcogenide phase change material film to obtain an all-optical switch. The etching process is ion-coupled plasma etching, and the deposition process is atomic layer deposition.

It can be easily understood by those skilled in the art that the above is only the preferred embodiment of the disclosure and is not intended to limit the disclosure. Any modification, equivalent replacement and improvement made within the spirit and principle of the disclosure should fall within the protection scope of the disclosure.

What is claimed is:

1. A chalcogenide phase change material based all-optical switch, comprising a cover layer film (104), a chalcogenide phase change material film (103), an isolation layer film (102), and a silicon photonic crystal (101) and a substrate (100) stacked in sequence,
   wherein the silicon photonic crystal (101) comprises a nano-porous structure (120), so that the silicon photonic crystal (101) has a Fano resonance effect,
   wherein a radius of nanopores in the nano-porous structure (120) is 50 nm to 90 nm, and a spacing between the nanopores is 700 nm to 850 nm, a depth of the nanopores is 150 nm to 250 nm.

2. The chalcogenide phase change material based all-optical switch according to claim 1, wherein a thickness of the chalcogenide phase change material film (103) is 5 nm to 25 nm, and the chalcogenide phase change material film (103) is a multi-component chalcogenide phase change material or a doped compound formed by doping impurities with the multi-component chalcogenide phase change material.

3. The chalcogenide phase change material based all-optical switch according to claim 2, wherein the multi-component chalcogenide phase change material is GeTe, SbTe, $Bi_2Te_3$, GeSe, $Bi_2Se_3$, $Ge_2Sb_2Te_5$ or AgInSbTe, and the impurities are C, N, O, Ag or Cu.

4. The chalcogenide phase change material based all-optical switch according to claim 1, wherein a thickness of the isolation layer film (102) is 15 nm to 40 nm, and the isolation layer film (102) is a $SiO_2$ film or a $SiN_x$ film.

5. The chalcogenide phase change material based all-optical switch according to claim 1, wherein a thickness of the cover layer film (104) is 20 nm to 200 nm, and the cover layer film (104) is a $SiO_2$/ZnS film, a $SiO_2$ film or a $SiN_X$ film.

6. The chalcogenide phase change material based all-optical switch according to claim 1, wherein when the all-optical switch is in use, the state of the chalcogenide phase change material film (103) is controlled by laser, and a resonance state of the silicon photonic crystal (101) is modulated to realize modulation of signal light transmittance, a modulation range is 1500 nm to 1600 nm in a communication band, thereby realizing optical switching.

7. A manufacturing method of the chalcogenide phase change material based all-optical switch according to claim 1, comprising:

(1) depositing a single crystal silicon material on the substrate, and etching the nanopores on the single crystal silicon material to form the silicon photonic crystal;

(2) depositing the isolation layer film with a thickness of 15 nm to 40 nm on the silicon photonic crystal;

(3) depositing the chalcogenide phase change material film with a thickness of 5 nm to 25 nm on the isolation layer film;

(4) depositing the cover layer film with a thickness of 20 nm to 200 nm and having oxidation resistance on the chalcogenide phase change material film to obtain the all-optical switch.

8. The manufacturing method of the chalcogenide phase change material based all-optical switch according to claim 7, wherein the etching process is electron beam lithography or ion-coupled plasma etching, and the deposition process is chemical vapor deposition, physical vapor deposition, electron beam evaporation coating, pulsed laser deposition, atomic layer deposition, DC magnetron sputtering or radio frequency magnetron sputtering.

* * * * *